(12) United States Patent
Lee et al.

(10) Patent No.: US 11,528,199 B2
(45) Date of Patent: Dec. 13, 2022

(54) METHOD FOR NETWORK INSPECTION SAVING PACKET AND SYSTEM PERFORMING THE SAME

(71) Applicant: XABYSS INC., Seoul (KR)

(72) Inventors: Si Young Lee, Daejeong (KR); Kyung Ho Park, Hwaseong-si (KR)

(73) Assignee: XABYSS INC., Seoul (KR)

( * ) Notice: Subject to any disclaimer, the term of this patent is extended or adjusted under 35 U.S.C. 154(b) by 41 days.

(21) Appl. No.: 17/055,423

(22) PCT Filed: Nov. 6, 2018

(86) PCT No.: PCT/KR2018/013374
§ 371 (c)(1),
(2) Date: Nov. 13, 2020

(87) PCT Pub. No.: WO2019/221346
PCT Pub. Date: Nov. 21, 2019

(65) Prior Publication Data
US 2021/0119887 A1 Apr. 22, 2021

(30) Foreign Application Priority Data
May 15, 2018 (KR) ........................ 10-2018-0055291

(51) Int. Cl.
*H04L 43/026* (2022.01)
*H04L 43/028* (2022.01)
(Continued)

(52) U.S. Cl.
CPC .......... *H04L 43/026* (2013.01); *H04L 43/028* (2013.01); *H04L 43/10* (2013.01);
(Continued)

(58) Field of Classification Search
CPC ..... H04L 43/026; H04L 43/028; H04L 43/10; H04L 47/2441; H04L 47/2483; H04L 63/20
See application file for complete search history.

(56) References Cited

U.S. PATENT DOCUMENTS 8,494,985 B1 * 7/2013 Keralapura ............. H04L 63/12
706/12
8,577,817 B1 * 11/2013 Keralapura ............. G06N 20/00
370/235

(Continued)

FOREIGN PATENT DOCUMENTS

| KR | 10-2008-0090712 | 10/2008 |
|---|---|---|
| KR | 10-2008-0126888 | 6/2010 |

(Continued)

OTHER PUBLICATIONS

International Search report dated Feb. 14, 2019, issued in International Application No. PCT/KR2018/013374 (with English Translation).

*Primary Examiner* — George C Neurauter, Jr.
(74) *Attorney, Agent, or Firm* — H.C. Park & Associates, PLC

(57) ABSTRACT

A system and a method which are capable of: collecting packets on a network so as to generate a flow and a session in stages; performing a traffic inspection by using only a small number of packets on the basis of the generated information; and searching packets at a high speed while reducing storage capacity of a packet.

10 Claims, 5 Drawing Sheets

(51) Int. Cl.
*H04L 43/10* (2022.01)
*H04L 47/2441* (2022.01)
*H04L 47/2483* (2022.01)
*H04L 9/40* (2022.01)

(52) U.S. Cl.
CPC ...... *H04L 47/2441* (2013.01); *H04L 47/2483* (2013.01); *H04L 63/20* (2013.01)

(56) References Cited

U.S. PATENT DOCUMENTS

| | | | | |
|---|---|---|---|---|
| 8,578,024 | B1 * | 11/2013 | Keralapura | H04L 47/2441 709/224 |
| 8,732,833 | B2 | 5/2014 | Choi et al. | |
| 8,843,627 | B1 * | 9/2014 | Baldi | H04L 43/50 709/224 |
| 8,964,548 | B1 * | 2/2015 | Keralapura | H04L 43/026 370/235 |
| 9,426,071 | B1 * | 8/2016 | Caldejon | H04L 43/026 |
| 9,479,405 | B1 * | 10/2016 | Tongaonkar | H04L 47/2441 |
| 2013/0160122 | A1 | 6/2013 | Choi et al. | |
| 2017/0237640 | A1 * | 8/2017 | Stocker | H04L 43/04 709/224 |
| 2017/0359264 | A1 * | 12/2017 | Bird | H04L 47/2416 |
| 2018/0091388 | A1 * | 3/2018 | Levy | H04L 43/12 |
| 2019/0230038 | A1 * | 7/2019 | Hughes | H04L 45/72 |
| 2021/0029050 | A1 * | 1/2021 | Jain | H04L 47/2441 |

FOREIGN PATENT DOCUMENTS

| | | |
|---|---|---|
| KR | 10-2010-0068508 | 6/2010 |
| KR | 10-2011-0019891 | 9/2012 |
| KR | 10-1211147 | 12/2012 |
| KR | 10-2013-0068631 | 6/2013 |
| KR | 10-2014-0064149 | 5/2014 |
| KR | 10-1528928 | 6/2015 |
| KR | 10-2015-0020375 | 8/2016 |
| KR | 10-2016-0097907 | 8/2016 |
| KR | 10-1715107 | 3/2017 |

\* cited by examiner

METHOD FOR NETWORK INSPECTION SAVING PACKET AND SYSTEM PERFORMING THE SAME

CROSS-REFERENCE TO RELATED APPLICATION

This application is a National Stage Entry of International Application No. PCT/KR2018/013374, filed on Nov. 6, 2018, and claims priority from and the benefit of Korean Patent Application No. 10-2018-0055291, filed on May 15, 2018, each of which is hereby incorporated by reference for all purposes as if fully set forth herein.

BACKGROUND

Field

Exemplary embodiments of the present invention relate to a network inspection method performing packet storage and a system for performing the same. More particularly, exemplary embodiments of the present invention relate to a network inspection method performing packet storage and a system for performing the same, which can collect packets on a network so as to generate flows and sessions in stages, perform a traffic inspection by using only a small number of packets on the basis of the generated information, and search packets at a high speed while reducing storage capacity of packets.

Discussion of the Background

Existing network control and management systems have tried to achieve prevention of routing, quality of service (QoS), or distributed denial of service (DDoS), which is a specific unit goal of the corresponding systems on the basis of packet information of transmission control protocol (TCP)/user datagram protocol (UDP) or internet protocol (IP). However, the packet-based approach ignores the information related to the communication relationship of the upper applications and relies only on the information contained in each separate packet, which is a temporary information transmission unit, thereby reducing the processing speed and largely the applicability. Due to their limitations, they are offered in the form of a single system for independent goals such as routers for packet routing, dedicated systems to defend against DDoS attacks, or deep packet inspection (DPI) systems for traffic control. Among these, the DPI system adopts a method of finding and detecting well-known port numbers and payload signatures used by a specific application or client (e.g., a P2P client), and controlling the detected packets. By detecting these signatures, it is known which client, i.e., the application, is currently generating and/or transmitting packets in the network, and performs appropriate network control in accordance with certain policies.

However, the conventional DPI system has a disadvantage in that the processing overhead is too large because the payload of every packet to be transmitted must be checked. In other words, high speed and expensive equipment is required to detect payloads of all packets. In addition, when the payload is an encrypted packet, the signature may not be detected because there is no way to solve the encryption. In addition, even if it is not encrypted, there is no guarantee that the signature is necessarily found, and there is a problem that it is difficult to find all the signatures.

In order to solve the above-mentioned problems, the inventor of the present invention filed a patent application entitled "Network inspection system and a method of providing the same", Korean Patent Application No. 10-2011-0019891.

However, since such a prior application generates only flows based on packets, there is a problem in that session information is not known. In addition, compared to sessions, flows have to be very large. There is a problem that it takes a lot of time to perform when packet search is performed if lots of packets are stored as in a network recording system.

In order to solve the above problems, the inventor of the present invention has proposed a method of storing some preceding packets in the early stage, out of the packets forming sessions, and performing security inspection of the preceding packets (hereinafter, called a "conventional method"), Korean Patent Application No. 10-2015-0020375. However, the conventional method has a disadvantage in that it cannot detect an attack when an attacker tries to attack after transmitting packets which do not include payloads several times, for instance, TCP SYN packets or others.

The above information disclosed in this Background section is only for understanding of the background of the inventive concepts, and, therefore, it may contain information that does not constitute prior art.

SUMMARY

Accordingly, the present invention has been made in an effort to solve the above-mentioned problems occurring in the prior arts, and exemplary embodiments of the present invention provide a method and a system which can store some initial packets of a session by reading and inspecting packets in real time so as to effectively perform security inspection of the packets.

Exemplary embodiments of the present invention also provide a method and a system, which can significantly reduce the number of packets stored for recording network traffic and support a high-speed packet search.

Exemplary embodiments of the present invention also provide a method and a system, which can cope with an attack that an attacker attacks after transmitting packets which do not include any information, namely, payloads, several times at the early stage of the session.

Additional features of the inventive concepts will be set forth in the description which follows, and in part will be apparent from the description, or may be learned by practice of the inventive concepts.

An exemplary embodiment of the present invention provides a network inspection method including the steps of: receiving, by a network inspection system, a plurality of packets from a network; generating, by the network inspection system, a plurality of flows formed by the plurality of packets based on the received plurality of packets; extracting, by the network inspection system, at least one session forming flow forming the same session among the plurality of flows based on information on the generated plurality of flows; specifying session information about the session based on information on the at least one session forming flow extracted by the network inspection system; and storing payloads of K bytes (here, K is a natural number) included in the session with the specified session information.

The step of storing payloads of K bytes (here, K is a natural number) included in the session with the specified session information may include the steps of: specifying an initial payload packet including a payload, among the packets forming the session; and storing M following packets from the initial payload packet, among the packets forming the session, with the specified session information, wherein M is the smallest natural number that the size of the payload included in M packets from the initial payload packet is greater than K bytes (here, K is a natural number).

The step of storing payloads of K bytes (here, K is a natural number) included in the session with the specified session information may include the step of storing the initial M preceding packets of the session with the specified session information, wherein M is the smallest natural number that the size of the payload included in M packets from the initial packet is greater than K bytes (here, K is a natural number).

The step of storing payloads of K bytes (here, K is a natural number) included in the session with the specified session information may include the step of storing M following packets from the $N^{th}$ packet (here, N is a natural number) of the session with the specified session information, wherein M is the smallest natural number that the size of the payload included in M following packets from the $N^{th}$ packet of the session is greater than K bytes (here, K is a natural number).

The step of storing payloads of K bytes (here, K is a natural number) included in the session with the specified session information may include the step of storing M following packets from the $N^{th}$ packet (here, N is a natural number) of the session with the specified session information, wherein N is the smallest natural number that the size of the payload included in N following packets from the initial packet of the session is greater than G bytes (here, G is a natural number), and M is the smallest natural number that the size of the payload included in M following packets from the $N^{th}$ packet of the session is greater than K bytes (here, K is a natural number).

Another exemplary embodiment of the present invention provides a network inspection method including the steps of: receiving, by a network inspection system, a plurality of packets from a network; generating, by the network inspection system, a plurality of flows formed by the plurality of packets based on the received plurality of packets; extracting, by the network inspection system, at least one session forming flow forming the same session among the plurality of flows based on information on the generated plurality of flows; specifying session information about the session based on information on the at least one session forming flow extracted by the network inspection system; and storing M packets (here, M is a natural number) included in the session with the specified session information.

The step of storing M packets (here, M is a natural number) included in the session with the specified session information may include the step of storing M following packets from the $N^{th}$ packet (here, N is a natural number) included in the session with the specified session information.

The step of storing M packets (here, M is a natural number) included in the session with the specified session information may include the step of storing M following packets from the $N^{th}$ packet with the specified session information, wherein N is the smallest natural number that the size of the payload included in N following packets from the initial packet of the session is greater than G bytes (here, G is a natural number).

The network inspection method may further include the step of performing security inspection for the payloads of K bytes by the network inspection system.

The network inspection method may further include the step of performing security inspection for the N packets by the network inspection system.

The session information may include identification information of at least one session forming flow to form the session.

The network inspection method may further include the step of storing flow information on the at least one session forming flow.

The network inspection method may further include the steps of: receiving a packet search request stored in the storage device; and specifying session information corresponding to the packet search in response to the packet search request, specifying a session forming flow corresponding to the packet search based on the specified session information, and extracting a packet corresponding to the packet search request based on the specified session forming flow.

Another exemplary embodiment of the present invention may provide a computer program installed in a data processor and recorded to carry out the above-mentioned method.

Another exemplary embodiment of the present invention provides a network inspection system including: a flow generation module for generating a plurality of flows formed by a plurality of packets based on the plurality of packets received from a network; and a session generation module which extracts at least one session forming flow that forms the same session among the plurality of flows based on the information about the plurality of the generated flows, specifies session information based on information on the extracted at least one session forming flow, and stores a payload of K bytes (here, K is a natural number) included in the session with the specified session information.

The session generation module may specify an initial payload packet including a payload, among the packets forming the session, and store M following packets from the initial payload packet, among the packets forming the session, with the specified session information, wherein M is the smallest natural number that the size of the payload included in M packets from the initial payload packet is greater than K bytes (here, K is a natural number).

The session generation module may store the initial M preceding packets of the session with the specified session information, wherein M is the smallest natural number that the size of the payload included in M packets from the initial packet is greater than K bytes (here, K is a natural number).

The session generation module may store M following packets from the $N^{th}$ packet (here, N is a natural number) of the session with the specified session information, wherein M is the smallest natural number that the size of the payload included in M following packets from the $N^{th}$ packet of the session is greater than K bytes (here, K is a natural number).

The session generation module may store M following packets from the $N^{th}$ packet (here, N is a natural number) of the session with the specified session information, wherein N is the smallest natural number that the size of the payload included in N following packets from the initial packet of the session is greater than G bytes (here, G is a natural number), and M is the smallest natural number that the size of the payload included in M following packets from the $N^{th}$ packet of the session is greater than K bytes (here, K is a natural number).

Another exemplary embodiment of the present invention provides a network inspection system including: a flow generation module for generating a plurality of flows formed by a plurality of packets based on the plurality of packets received from a network; and a session generation module which extracts at least one session forming flow that forms the same session among the plurality of flows based on the information about the plurality of the generated flows, specifies session information based on information on the extracted at least one session forming flow, and stores M packets (here, M is a natural number) included in the session with the specified session information.

The session generation module may store M following packets from the $N^{th}$ packet (here, N is a natural number) included in the session with the specified session information.

The session generation module may store M following packets from the $N^{th}$ packet with the specified session information, and N is the smallest natural number that the size of the payload included in N following packets from the initial packet of the session is greater than G bytes (here, G is a natural number).

The network inspection system may further include a security inspection module for performing security inspection for the payloads of K bytes.

The network inspection system may further include a security inspection module for performing security inspection for the N packets.

The session information may include identification information of at least one session forming flow to form the session, and the flow generation module may store flow information on each session forming flow.

The network inspection system may further include a packet search module, which receives a packet search request stored in the storage device, specifies session information corresponding to the packet search in response to the packet search request, specifies a session forming flow corresponding to the packet search based on the specified session information, and extracts a packet corresponding to the packet search request based on the specified session forming flow.

According to the inventive concepts, the method and the system can generate information of flows and sessions based on the flows while inspecting packets at a high speed, so as to perform security inspection in real time under a high-speed network environment.

Moreover, the method and the system according to the inventive concepts can significantly reduce the number of packets stored for recording a network, and support high speed packet search based on session information and flow information.

Furthermore, the method and the system according to the inventive concepts can cope with an attack that an attacker attacks after transmitting packets which do not include any information, namely, payloads, several times at the early stage of the session.

Additionally, the method and the system according to the inventive concepts can cope with an attack that an attacker attacks after transmitting some of normal packets at the early stage of the session.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
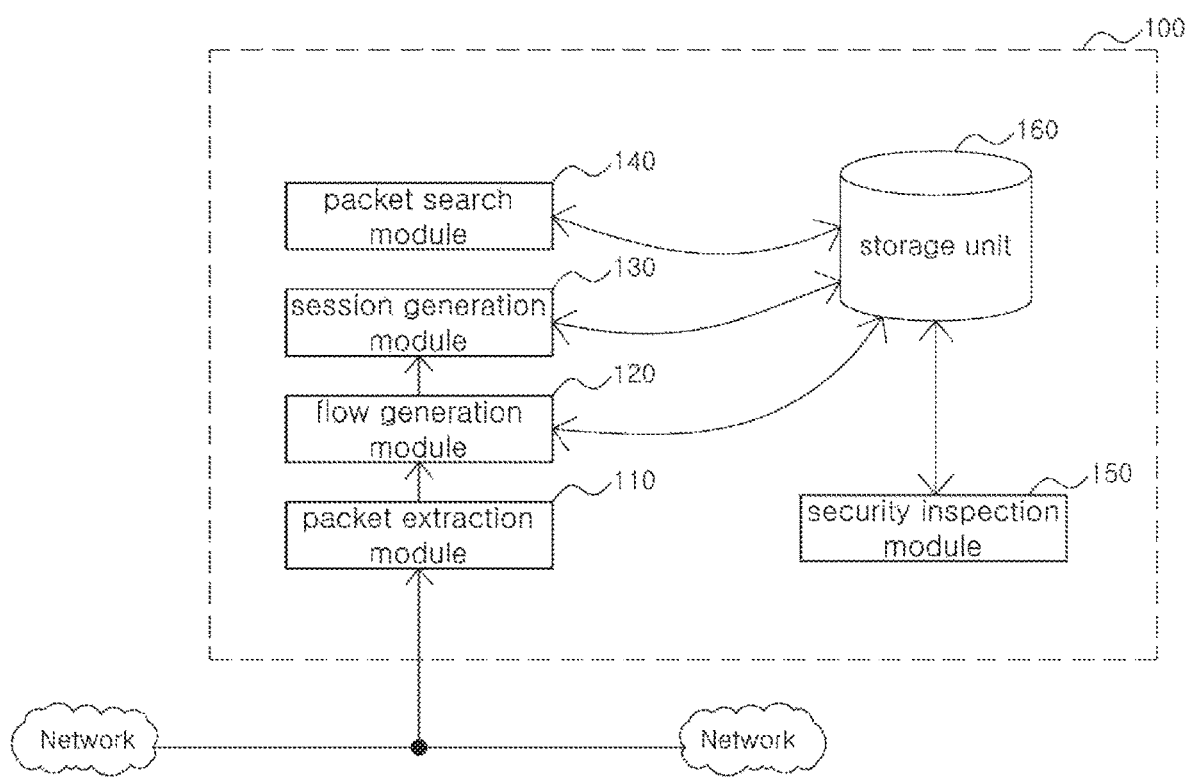
FIG. 1 is a view showing a schematic configuration of a network inspection system according to an embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

When an exemplary embodiment may be implemented differently, a specific process order may be performed differently from the described order. For example, two consecutively described processes may be performed substantially at the same time or performed in an order opposite to the described order. Also, like reference numerals denote like elements.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

It will be understood that terms, such as "first" or "second" may be used in the specification to describe various components but are not restricted to the above terms. The terms may be used to discriminate one component from another component.

It will be further understood that the words or terms used in the present invention are used to describe specific embodiments of the present invention and there is no intent to limit the present invention. The singular form of the components may be understood into the plural form unless otherwise specifically stated in the context.

It should be also understood that the terms of 'include' or 'have' in the specification are used to mean that there are characteristics, numbers, steps, operations, components, parts, or combinations of the steps, operations, components and parts described in the specification and there is no intent to exclude existence or possibility of other characteristics, numbers, steps, operations, components, parts, or combinations of the steps, operations, components and parts.

Moreover, it will be understood that when an element transmits data to another element, it can directly transmit to the other element or at least one intervening element may be present. In contrast, when an element "directly transmits" data to another element, there are no intervening elements present.

Hereinafter, the present disclosure will be described with reference to the attached drawings. Like reference numerals in the drawings denote like elements.

FIG. 1 is a schematic configuration of a network inspection system according to an embodiment of the present invention. The network inspection system can perform a network inspection method according to the inventive concepts.

Referring to FIG. 1, the network inspection system 100 according to an exemplary embodiment of the present invention includes a flow generation module 120 and a session generation module 130. The network inspection system 100 may further include a packet extraction module 110. In addition, the network inspection system 100 may further include a packet search module 140. In addition, the network inspection system 100 may further include a security inspection module 150 and/or a storage unit 160.

In an exemplary embodiment, the network inspection system 100 may be a communication device organizing network by connecting several network units with each other. The network inspection system 100 may be a system connected with such a communication device, for instance, a hub, an access point, or a router.

The network inspection system 100 may have a hardware resource and/or software necessary for realizing the inventive concepts, and it is not essential necessary that the network inspection system 100 means a physical component or a device. That is, the network inspection system 100 may mean a logical combination of hardware and/or software formed to realize the inventive concepts, and if necessary, may be formed by a group of logical components which are installed in devices separated from each other to perform their own functions so as to realize the inventive concepts. Additionally, the network inspection system 100 may be a group of components which are separately implemented by functions or roles to realize the inventive concepts.

The module in the present specification may mean functional and structural combination of hardware for carrying out the inventive concepts and software for running the hardware. For instance, the module may mean a logical unit of a predetermined code and a hardware resource for running the predetermined code, and average experts in the technical field of the present invention can easily deduce that the module does not necessarily mean a physically connected code or one kind of hardware.

The storage unit 160 may be a device for storing data and/or information necessary to realize the inventive concepts. The storage unit 160 in an embodiment may a database or a non-volatile storage, for instance, HDD, SDD or the like.

The packet extraction module 110 may receive a plurality of packets from a network. The packet extraction module 110 may be installed at a predetermined position on the network to collect packets moving through the network. According to an example, the packet extracting module 110 may be implemented on the network in a tapping mode that receives the packets from a device tapping packets from the network as shown in FIG. 1, but is not limited thereto. The packets may be applied to the packet extraction module in some other way.

Alternatively, the packets may be implemented on the network in an in-line mode such that the packets pass through the packet extraction module 110 and move on the network.

The packet extraction module 110 may, for instance, be located at the front and/or rear of a gateway existing on a predetermined local area network (LAN) to collect network data in accordance with the inventive concepts. Then, the network inspection system 100 may control the network/traffic according to the inspection result. Controlling network/traffic may refer to artificial actions such as adjusting bandwidth, transmission rate or blocking transmission for each session, flow, and/or packet. The packet extraction module 110 may be implemented with, for example, a predetermined network interface card (NIC), but is not limited thereto.

The flow generation module 120 may generate a plurality of flows based on the packets received by the packet extraction module 110. The packet extraction module 110 may sequentially output packets to the flow generation module 120. Then, the flow generation module 120 may generate a flow. Generating a flow may mean generating flow information as described below. According to an embodiment of the present invention, the flow generation module 120 may optionally extract the packet included in the flow and store it in the storage unit 160. The flow generation module 120 may store all packets corresponding to a predetermined flow, but according to an embodiment of the present invention, only some of packets at the early stage of the session including the flow may be finally stored in the storage unit 160, as will be described later.

Of course, the flow generation module 120 may temporarily store the flow and all the packets included in the flow in the storage unit 160, and the session generation module 130 may selectively store only some of the stored packets and delete the rest.

In the present specification, the term "flow" refers to a set of IP packets continuously delivered within a limited time. Thus, IP flows can include the application's address pairs (sender address, sender port number, receiver address, receiver port number), host pairs (sender network address, receiver network address), AS number pairs (sender AS number, receiver AS number), and so on. It can be defined as the flow of IP packets continuously delivered within the limited time specified by. The concept of the flow and the manner of forming the flow is described in detail in the above-mentioned related art documents, so the detailed description thereof will be omitted. Moreover, the concept of the flow and the method of generating the flow in the present specification include the description disclosed in the above-mentioned related art documents as a reference of the present specification, and may be treated as being included in the description of the present specification.

An example of generating a flow among the attributes of packets may use a 5-tuple. That is, the packet extraction module 110 may receive packets as inputs on the network to generate a flow, which is a continuous set of packets, or extract some of the packets forming the flow. The conditions for generating flows or detecting flow packets are as follows: comparing with the attributes of the packets (e.g., 5-Tuple (Source Address, Destination Address, Source Port, Destination Port, Protocol)); generating a new flow if there is no packet having the same attributes (e.g., 5-tuple); and updating flow information of the flow if there is a packet having the same value.

A contiguous set of packets does not necessarily mean packets that are physically contiguous, but may be used to mean that an attribute of a packet reached within a limited time includes the same packet.

The flow information includes 5-tuple information of a packet, and includes a flow size, a duration, that is, a start time (ST) and an end time (ET) of a flow, and a packet count (PC), Average Packet Size, Average Rate, Flags (e.g., special signals for protocols (SYN, FIN, etc.)) and/or follow size. The flow information may be output to storage unit 160 and stored. The flow generation module 120 may store the flow information for a predetermined flow and the packets included in the flow in the storage unit 160 to correspond. This process may be defined as the flow generation module 120 generating a flow. For instance, the flow information and the packets included in the flow may be stored to be physically continuous, or may be stored in various forms that can be easily searched even though they are physically separated, such as a table or a link.

Some of the packets thus stored may be deleted based on the session information generated by the session generation module 130. For instance, some of the packets may be deleted except for the initial N preceding packets of the session. Alternatively, some of the packets may be deleted except the preceding packets including the initial payload of N bytes at the early stage of the session. Furthermore, according to an embodiment of the present invention, only flow information may be stored for a specific flow, and a packet corresponding to the specific flow may not be stored.

When the plurality of flows are generated by the flow generation module 120, the session generation module 130 can generate a session based on the plurality of flows. Generating a session means extracting flows forming the same session among a plurality of generated flows, generating session information including identification information of the extracted flows, and storing the generated session information in the storage unit 160.

In an embodiment of the present invention, flows and sessions may be generated in the following manner.

The flow generation module 120 judges on the basis of 5-tuple of the packet, amends the corresponding flow information if the corresponding packet is included in the remaining flow without being ended (5-tuple), namely, if the information is the same, and indicates that the corresponding packet is subordinated to the corresponding flow.

If the corresponding packet is not subordinated to the specific flow according to the judgment on the basis of 5-tuple information of the corresponding packet, the flow generation module 120 may generate a new flow and indicate that the corresponding packet is subordinated to the new flow.

When the new flow is generated, the session generation module 130 judges on the basis of 5-tuple information of the flow, amends the corresponding session information if the corresponding flow is included in the remaining session without being ended, and indicates that the corresponding flow is subordinated to the corresponding session. If the corresponding flow is not subordinated to the specific session according to the judgment on the basis of 5-tuple information of the corresponding flow, the session generation module 130 may generate a new session and indicate that the corresponding flow is subordinated to the new session. If a packet informing the end of the session is received, the flow and the session including the corresponding packet are ended, and it is stored in the storage unit 160. In case of the remaining flow and session without being ended, if the packet included in the corresponding flow or the corresponding session is not received for a predetermined period of time, the corresponding flow and the corresponding session may be ended.

Moreover, generating a session may mean to include a process of storing the session information and some of the packets included in the session to correspond to the session information. For instance, when a session is generated, the session generation module 130 may store initial M preceding packets, out of the packets included in the session, to correspond to the session information. Alternatively, the session generation module 130 may store M preceding packets from the $N^{th}$ packet, out of the packets included in the session, to correspond to the session information. Alternatively, the session generation module 130 may store the session information and packets having payloads of K bytes at the early stage of the session, out of the packets included in the session, to correspond to the session information. In another way, the session generation module 130 may store follow-up packets having payloads of K bytes from the $N^{th}$ packet to correspond to the session information. The above will be described in more detail later.

The process of storing some packets to correspond to the session information may be a process of deleting the packets already stored by the flow generation module 120 except some of the packets. Alternatively, the session information and the packets may be stored separately. In this case, the corresponding packet may be stored in duplicate.

Alternatively, the process of storing some packets to correspond to the session information may be a process of temporarily storing only the packets to be stored in a volatile memory, throwing out the packets which are not to be stored, and storing the packets stored in the volatile memory in the storage unit 160 at the time of termination of the session.

The concept of generating a session by the session generation module 130 will be described with reference to FIG. 2.

Figure 2:
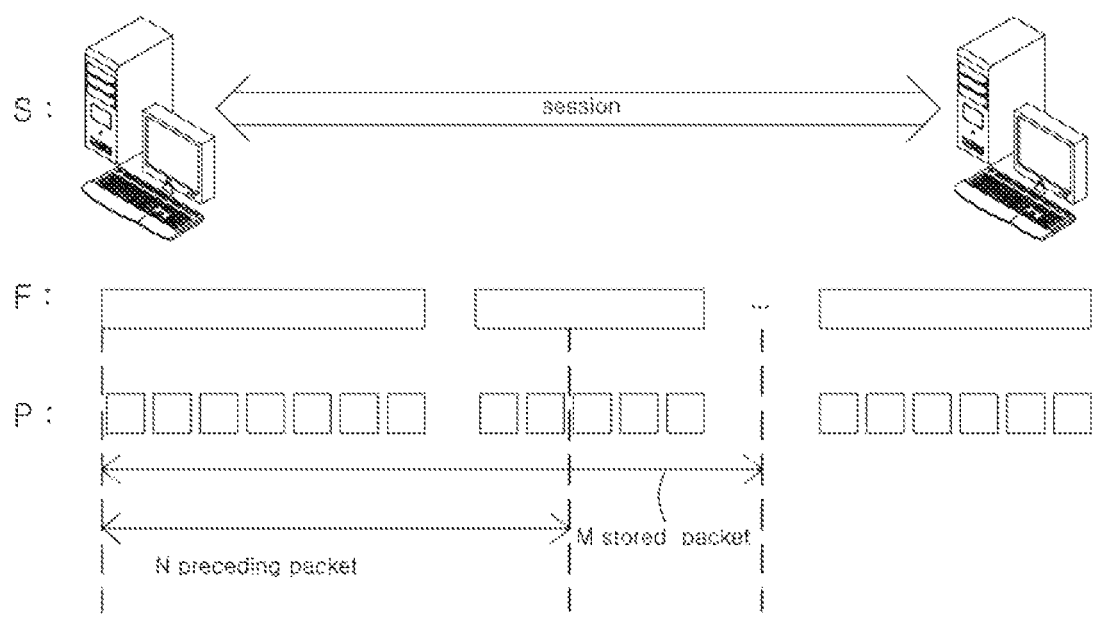
FIG. 2 is a schematic diagram illustrating a session, flows, and packets for a network inspection method according to an embodiment of the present invention.

FIG. 2 is a diagram illustrating a session, a flow, and a packet for a network inspection method according to an embodiment of the present invention.

Referring to FIGS. 1 and 2, when sessions S are formed between predetermined devices, the session S may be configured of at least one flow F. Furthermore, the at least one flow may be composed of at least one packet (P).

According to the inventive concepts, the network inspection system 100 may collect packets passing through a point on a predetermined network. This may be performed by the packet extraction module 110.

The network inspection system 100 may generate a flow based on packet attributes (e.g., 5 tuples) of the collected packets. The method of generating the flow is as described above. The generation of such a flow may be performed by the flow generation module 120. Each flow may consist of only one packet or may consist of a plurality of packets. In addition, the flow size may be different for each flow.

On the other hand, when the flow is generated in this way, the session generation module 130 may generate a session.

In order to generate a session, the session generation module 130 may check flow information stored in the storage unit 160. Flows included in the same session may have common characteristics. Therefore, the session generation module 130 may search for the flows having the common characteristics among the flows stored in the storage unit 160. Additionally, the session generation module may determine temporal priority of each flow based on the flow information (for example, information of S.T, E.T, etc. included in the flow information). The session generation module 130 may grasp the first flow and the last flow of the corresponding session based on the flag information included in the flow information of each session forming flow.

Therefore, the session generation module 130 may extract at least one flow included in a specific session, that is, session formation flow. The session forming flow may be one flow or may include a plurality of flows.

Like the above, the network inspection system 100 according to the inventive concepts does not generate only a flow, but generates a session based on the generated flow because grasping all important characteristics of the corresponding session by some data at the early stage of the session. Therefore, compared with the conventional related arts of storing and inspecting all of the collected packets (e.g., DPI) or storing and inspecting the predetermined number of preceding packets by flows, the network inspection system according to the inventive concepts can inspect characteristics of a predetermined application or desired information just by a smaller number of security inspections. In general, it is known that there is no significant difference in the quality of inspection as compared to the inspection of all packets included in the session as much as the inspection of packets in the initial five packets of the session. Of course, according to the discretion of the service subject, all packets of the session may be stored.

In addition, according to the inventive concepts, when the network inspection system 100 provides a network recording service, there is an effect that only a smaller number of packets can be stored as compared with the related art. Therefore, there is an effect that a gain in storage can occur.

Moreover, in the case of generating a flow from a packet and generating a session using the generated flow as in the inventive concepts, even when a specific service user searches for a packet, the user can do high-speed packet search. That is, the network inspection system 100 may store all packets collected instead of storing only some of the initial preceding packets (or some of the initial payloads) of the session. In this case, the network inspection system 100 first searches for the session information generated by creating a session, searches a session corresponding to a desired packet, searches a flow corresponding to the desired packet from the searched session, and searches the packet on the basis of the searched flow, so that the network inspection system according to the present invention can do downdrill search at high speed. The reason is that if the user creates only flows, the user can search packets the number of flows in the worst case, but in the case that the session is created, the user can carry out search to the number of sessions in the worst case and search a flow and a packet corresponding to the packet quickly. Of course, this effect still exists even when storing only some of the initial preceding packets (or some of the initial payloads). Furthermore, a service user who wants to search for a packet may know information about a session, but may not know information about a flow. Therefore, when a session is created as in the inventive concepts, the user can do an efficient and high-speed packet search in a network recording service.

Referring back to FIG. 1, the session generation module 130 may generate a session based on a plurality of flows generated by the flow generation module 120. That is, the session generation module 130 can generate session information.

The session information may include at least one flow included in the session, that is, an index (identification information) of each session formation flow. In addition, various information representing the characteristics of the session may be further included in the session information.

As described above, high-speed packet search may be possible through the generation of such session information, and only some of the packets to be stored may be specified through generation of the session.

Figure 3:
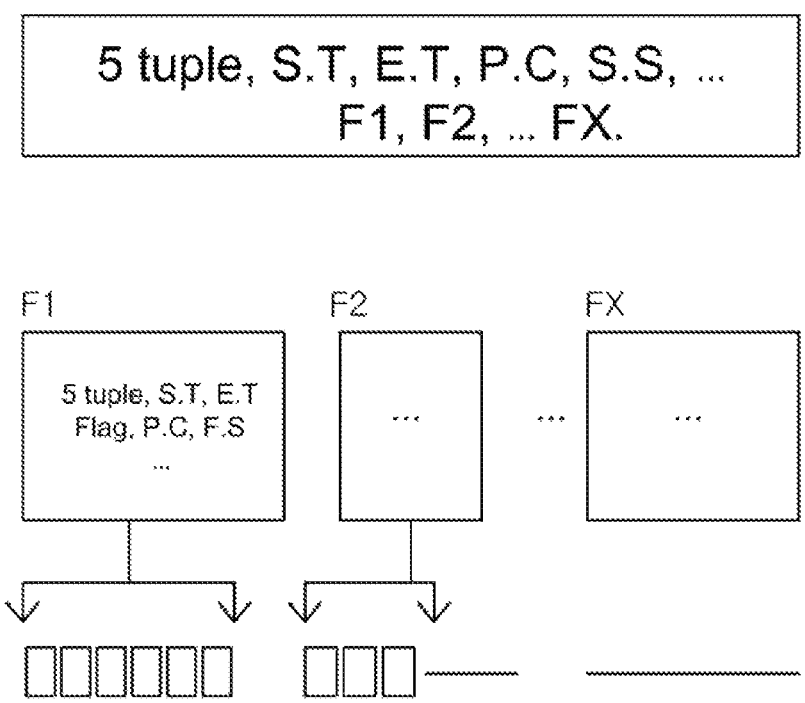
FIG. 3 is a diagram illustrating a concept of performing a packet search in the network inspection method according to the embodiment of the present invention.

Referring to FIG. 3, a conceptual structure in which packets of the present invention are stored may be described as follows.

FIG. 3 is a diagram illustrating a concept of performing a packet search according to the network inspection method according to the embodiment of the present invention.

Referring to FIG. 3, the session generation module 130 may generate a predetermined session as described above. The session information generated through the creation of the session may include at least identification information of the session forming flow included in the session, as shown in FIG. 3.

Furthermore, the session information may further include information on 5-tuple of the session, start time (S.T) and end time (E.T), packet count (P, C), session size (S.S), and the like.

The packet search module 140 included in the network inspection system 100 may first search for a session corresponding to a packet search request in response to the packet search request received from a terminal (not shown) of a service user. Of course, the packet search request may include at least one information included in the session information. For example, a sender address, a receiver address, time information, and the like may be included in the packet search request.

Then, the packet search module 140 may search for flow corresponding to the packet search request by searching for flow information of each of the session forming flows included in the session information. When a flow corresponding to the packet search request is searched, the packet search module 140 may easily search for a packet corresponding to the packet search request from the storage unit 160. Of course, when the network inspection system 100 stores only the preceding packets according to an embodiment of the present invention, the packet corresponding to the packet search request may not exist. Additionally, when storing all packets, it may be guaranteed that a packet corresponding to a packet search request is searched.

As a result, the inventive concepts are directed to generating a flow from a packet, generating a session from the flow, and then, searching for a packet, thereby enabling high-speed downdrill search in the order of session, flow, and packet.

Referring back to FIG. 1, the security inspection module 150 may perform security inspection on the packets subordinated to each session as described above. The manner of performing security inspection may vary, for instance, a conventional intrusion detection system (IDS) may be used. Of course, the inspection result of the security inspection module 150 may be stored in the storage unit 160. In addition, the security inspection module 150 may perform security inspection not for the whole session but only for some packets (for instance, the initial N preceding packets of the session) included in the session. Accordingly, the security inspection for the session may be completed in real time before the session is terminated. Therefore, the network inspection system 100 can insure that certain network controls (e.g., blocking, bandwidth adjustment, etc.) may be performed for the session.

Meanwhile, according to the inventive concepts, as described above, the network inspection system 100 may be used for a network recording service. Conventionally, all the collected packets were to be stored for network recording. However, according to the inventive concepts, when a session is created, only some of packets of the session (for instance, the initial M preceding packets or packets including payloads of K bytes) are stored, thereby significantly reducing the number of stored packets and storing important information. do. In this case, there is an effect of saving of storage compared to collecting/saving the entire packet.

Moreover, according to the inventive concepts, the network inspection system 100 may store only packets corresponding to a predetermined type of session. For example, the network inspection system 100 may perform network recording only for a predetermined session such as an HTTP or TCP session. Furthermore, the network inspection system can perform recording by varying storing methods according to network service ports. For instance, the network inspection system may not store packets in case of packets using 443 port, but store only the initial packets of K bytes of the session in case of packets using 80 port, and store all packets in case of packets using 22 ports. Additionally, the network inspection system may not store packets in case of packets received or sent by a specific IP.

As described above, the function of performing network recording only for a predetermined session, port or IP may be performed by the flow generating module 120 or may be generated by the session generation module 130. For instance, the flow generation module 120 may generate a flow targeting only packets corresponding to a predetermined session among the packets collected by the packet extraction module 110. Alternatively, the flow generation module 120 may generate a flow for all packets, and then, delete a flow that does not correspond to the predetermined session, among the flows generated by the session generation module 130, from the storage unit 160.

Whether or not the flow corresponds to the predetermined session may be determined based on port information of the packets. That is, a port number may be bound according to the type of session, and it may be determined whether a packet or a flow corresponds to the predetermined session based on the port number.

According to an embodiment of the present invention, the packet extraction module 110 may transmit only a packet corresponding to the predetermined session to the flow generation module 120.

In any case, the network inspection system 100 may perform network recording only for the predetermined session.

As a result, according to the inventive concepts, an absolute amount of packets to be stored may be reduced as compared with conventional network recording, and network recording may be performed only for a desired session.

The network inspection system 100 according to the inventive concepts does not store all the packets included in a specific session, but may store only some of packets (for instance, packets including the initial payloads of K bytes), so that the amount of the packets for each session can be reduced.

Moreover, the network inspection system 100 according to the inventive concepts does not store packets for all sessions, but can store only a predetermined type of sessions, so that packets are not stored for sessions which are not equivalent to the predetermined type.

As described above, according to the inventive concepts, it is possible to reduce the absolute amount of packets to be stored and to selectively store only packets that are meaningful for security inspection, thereby enabling high-speed packet search. At the same time, as described above, high-speed packet search is possible through the drilldown search in the order of session information and flow information.

Figure 4:
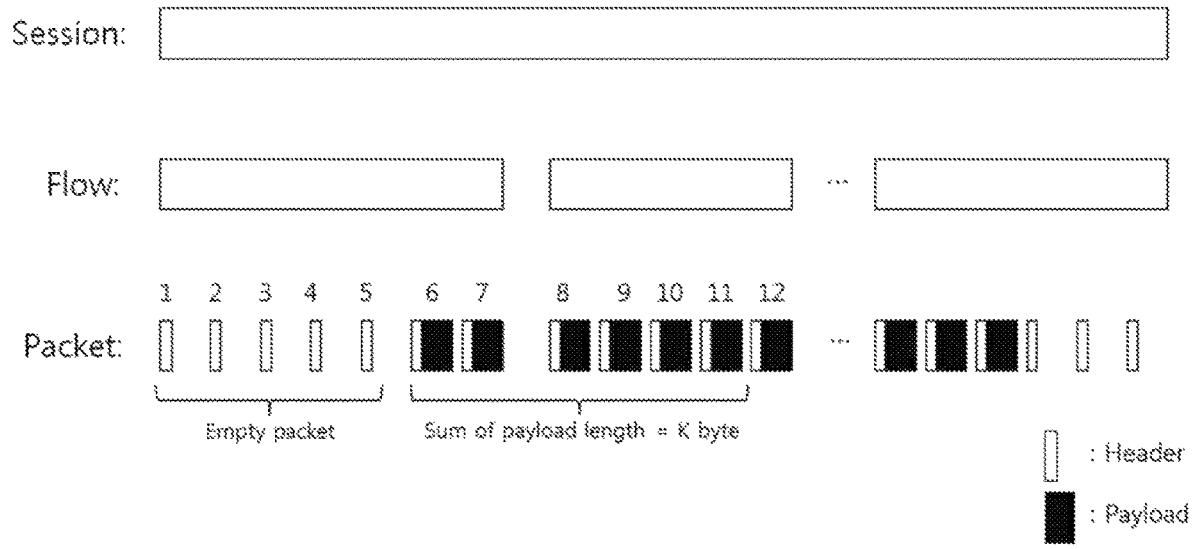
FIG. 4 is a diagram illustrating a method for storing the first preceding payload with a predetermined size in a specific session in the network inspection method according to the embodiment of the present invention.

As described above, the network inspection system 100 according to an embodiment of the present invention stores some of packets of each session (for instance, packets including the initial payloads of K bytes) so as to reduce the amount of the packets to be stored and enable the high-speed packet search. However, in the case that a network attacker sends attack packets which can be a serious threat to network after continuously sending packets, which have only meaningless headers but do not have any payload, (for instance, SYN, ACK, FIN, and the likes), there may occur a problem not to detect the attack packets. Therefore, the network inspection system 100 according to another embodiment of the present invention does not store the initial N preceding packets of each session but may store initial preceding payloads of K bytes or packets including the initial preceding payloads of K bytes with session information. Referring to FIG. 4, it will be described. Here, K may be a predetermined natural number.

FIG. 4 illustrates that initial five packets among the packets forming the session are packets having only headers, and the packets after the fifth packet include payloads.

Hereinafter, $i^{th}$ packet of a session S in FIG. 4 is expressed as $P_i$, a payload of the packet $P_i$ is expressed as $L_i$, and the size of the payload $L_i$ is expressed as $|L_i|$.

The session generation module 130 included in the network inspection system 100 according to an embodiment of the present invention may store from the first packet including a payload (or payload of a packet). Additionally, the session generation module 130 may store packets (or payloads of the packets) till the sum of payloads of the packets to be stored becomes a predetermined K byte.

In FIG. 4, the session generation module 130 may store from a payload $L_6$ of the initial packet $P_6$, which includes the payload. In addition, In FIG. 4, if $|L_6|+|L_7|+|L_8|+|L_9|+|L_{10}|+|L_{11}|=K$, the session generation module 130 may store to the payload $L_{11}$ of the packet $P_{11}$.

The session generation module 130 according to an embodiment may store only the preceding payload, but may store the packet including the corresponding preceding payload. That is, in FIG. 4, the session generation module 130 may store from the initial packet $P_6$ including the payload to the packet $P_{11}$ where the sum of the payloads becomes K bytes.

In the meantime, if the sum of payloads to the halfway payload included in a specific packet is K bytes, according to an embodiment, the session generation module 130 may store only to the halfway part of the payloads of the corresponding packet, or may store all of the corresponding packets. That is, in FIG. 5, in case of $|L_6|+|L_7|+|L_8|+|L_9|+|L_{10}|+|L_{11}|>K>|L_6|+|L_7|+|L_8|+|L_9|+|L_{10}|$, the session generation module 130 according to an example, may: i) store the halfway part between $L_6$ and $L_{11}$; ii) store the payloads from $L_6$ to $L_{11}$; or iii) store the packets $P_6$ to $P_{11}$.

According to an embodiment, the session generation module 130 may store up to packets including only headers. That is, the session generation module 130 may start to store from the initial packet of each session and store till the sum of the payloads becomes K. For instance, in FIG. 4, the session generation module 130 may store from $P_1$ to $P_{11}$.

Meanwhile, because the network inspection system must detect it even though an attacker sends attack packets which can be a serious threat to network after sending some of normal packets, in another embodiment of the present invention, the network inspection system may store the predetermined number of packets after skipping some of the initial packets of the session, and hereinafter, it will be described referring to FIG. 5.

Figure 5:
FIG. 5 is a diagram illustrating a method for storing packets with a predetermined size or the predetermined number of packets at the intermediate stage of the session in a network inspection method according to another embodiment of the present invention.

FIG. 5 illustrates an example that the present invention skips N packets at the early stage of the session and stores M packets from N+1$^{th}$ packet. In FIG. 5, N and M may be predetermined natural numbers.

If the i$^{th}$ packet of a session S is expressed as $P_i$, in FIG. 5, the session generation module 130 may skip $P_1$ to $P_N$ and store $P_{1+i}$ to $P_{N+M}$.

Meanwhile, M which is the number of the packets to be stored may be a predetermined value, but may be a value calculated by K which is the size of payloads to be stored. A payload of the packet $P_i$ is expressed as $L_i$, and the size of the payload $L_i$ is expressed as $|L_i|$. Then, M may be the smallest natural number satisfying $|L_{n+1}|+|L_{n+2}| \ldots +|L_{n+m}|=K$.

Meanwhile, N which is the number of the initial packet to be skipped may be also a predetermined value, but may be a value calculated by the size G of the payload to be skipped (G is a predetermined natural number). That is, N may be the smallest natural number that M satisfies $|L_1|+|L_2| \ldots +|L_n| \geq G$. In the meantime, the network inspection system 100 may perform security inspection for the preceding payloads to be stored or the packets including the preceding payloads in the same way.

In the meantime, according to an embodiment, the network inspection system 100 may include at least one processor and a memory for storing program executed by the processor. The processor may include a single core CPU or a multi core CPU. The memory may include a high-speed random-access memory, and may include one or more magnetic disk storage device, a flash memory device, or a nonvolatile memory such as a nonvolatile solid-state memory device. Access to the memory by the processor and other components may be controlled by a memory controller.

Meanwhile, the network inspection method according to an embodiment of the present disclosure can also be implemented in a form of an executable program command through a variety of computer means recordable to computer readable recording media. The computer readable recording medium is any data storage device that can store data which can be thereafter read by a computer system.

The program commands recorded to the recording media may be components specially designed for the present disclosure or may be usable to one of ordinary skill in the art.

Examples of the computer readable recording medium include magnetic media such as hard disks, floppy disks and magnetic tapes, optical media such as CD-ROMs and DVDs, magneto-optical media such as floptical disks, and hardware devices, which are specially formed to store and execute program commands, such as ROMs, RAMs and flash memories. Furthermore, the computer readable recording medium can be distributed to computer systems coupled through network so that computer readable codes are stored and executed in a distributed fashion.

Program commands include not only a machine language code made by a complier but also a high-level code that can be used by an interpreter, and the like, which is executed by a computer.

The aforementioned hardware device can perform work beyond that of a mere software module to perform the action of the present disclosure and they can do the same in the opposite case.

The foregoing description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, the foregoing embodiments should be regarded as illustrative rather than limiting in all aspects. In an example, each component which has been described as a unitary part can be implemented as distributed parts. Similarly, each component which has been described as distributed parts can also be implemented as a combined part.

The present invention can be used to a network inspection method performing packet storage and a system for performing the same.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A network inspection method comprising the steps of:
   receiving, by a network inspection system, a plurality of packets from a network;

generating, by the network inspection system, a plurality of flows formed by the plurality of packets based on the received plurality of packets, wherein a flow is defined as a set of packets continuously delivered within a limited time;

extracting, by the network inspection system, at least one session forming flow forming the same session among the plurality of flows based on information on the generated plurality of flows;

specifying session information about the session based on information on the at least one session forming flow extracted by the network inspection system; and storing payloads of K bytes (here, K is a natural number) included in the session with the specified session information, wherein the step of storing payloads of K bytes (here, K is a natural number) included in the session with the specified session information includes the steps of:

specifying an initial payload packet including a payload, among the packets forming the session; and storing M following packets from the initial payload packet, among the packets forming the session, with the specified session information, wherein M is the smallest natural number that the size of the payload included in M packets from the initial payload packet is greater than K bytes (here, K is a natural number).

2. A network inspection method comprising the steps of:

receiving, by a network inspection system, a plurality of packets from a network;

generating, by the network inspection system, a plurality of flows formed by the plurality of packets based on the received plurality of packets, wherein a flow is defined as a set of packets continuously delivered within a limited time;

extracting, by the network inspection system, at least one session forming flow forming the same session among the plurality of flows based on information on the generated plurality of flows;

specifying session information about the session based on information on the at least one session forming flow extracted by the network inspection system; and storing payloads of K bytes (here, K is a natural number) included in the session with the specified session information, wherein:

the step of storing payloads of K bytes (here, K is a natural number) included in the session with the specified session information includes the step of storing M preceding packets of the session, with the specified session information; and M is the smallest natural number that the size of the payload included in M packets from the initial packet is greater than K bytes (here, K is a natural number).

3. A network inspection method comprising the steps of:

receiving, by a network inspection system, a plurality of packets from a network;

generating, by the network inspection system, a plurality of flows formed by the plurality of packets based on the received plurality of packets, wherein a flow is defined as a set of packets continuously delivered within a limited time;

extracting, by the network inspection system, at least one session forming flow forming the same session among the plurality of flows based on information on the generated plurality of flows;

specifying session information about the session based on information on the at least one session forming flow extracted by the network inspection system; and storing payloads of K bytes (here, K is a natural number) included in the session with the specified session information, wherein:

the step of storing payloads of K bytes (here, K is a natural number) included in the session with the specified session information includes the step of storing M following packets from an $N^{th}$ packet (here, N is a natural number) of the session, with the specified session information; and M is the smallest natural number that the size of the payload included in M following packets from the $N^{th}$ packet of the session is greater than K bytes (here, K is a natural number).

4. A network inspection method comprising the steps of:

receiving, by a network inspection system, a plurality of packets from a network;

generating, by the network inspection system, a plurality of flows formed by the plurality of packets based on the received plurality of packets, wherein a flow is defined as a set of packets continuously delivered within a limited time;

extracting, by the network inspection system, at least one session forming flow forming the same session among the plurality of flows based on information on the generated plurality of flows;

specifying session information about the session based on information on the at least one session forming flow extracted by the network inspection system; and storing payloads of K bytes (here, K is a natural number) included in the session with the specified session information, wherein:

the step of storing payloads of K bytes (here, K is a natural number) included in the session with the specified session information includes the step of storing M following packets from an $N^{th}$ packet (here, N is a natural number) of the session, with the specified session information; and N is the smallest natural number that the size of the payload included in N following packets from the initial packet of the session is more than G bytes (here, G is a natural number), and M is the smallest natural number that the size of the payload included in M following packets from the $N^{th}$ packet of the session is greater than K bytes (here, K is a natural number).

5. A network inspection method comprising the steps of:

receiving, by a network inspection system, a plurality of packets from a network;

generating, by the network inspection system, a plurality of flows formed by the plurality of packets based on the received plurality of packets, wherein a flow is defined as a set of packets continuously delivered within a limited time;

extracting, by the network inspection system, at least one session forming flow forming the same session among the plurality of flows based on information on the generated plurality of flows;

specifying session information about the session based on information on the at least one session forming flow extracted by the network inspection system; and storing M packets (here, M is a natural number) included in the session with the specified session information in a storage device, wherein:

the step of storing M packets (here, M is a natural number) included in the session with the specified session information includes the step of storing M following packets from an $N^{th}$ packet (here, N is a natural number) with the specified session information; and N is the smallest natural number that the size of the payload included in N following packets from the initial packet of the session is greater than G bytes (here, G is a natural number).

6. A network inspection system comprising:

a storage device;

a flow generation module for generating a plurality of flows formed by a plurality of packets based on the plurality of packets received from a network, wherein a flow is defined as a set of packets continuously delivered within a limited time; and a session generation module which extracts at least one session forming flow that forms the same session among the plurality of flows based on the information about the plurality of the generated flows, specifies session information based on information on the extracted at least one session forming flow, and stores payloads of K bytes (here, K is a natural number) included in the session with the specified session information in the storage device, wherein:

the session generation module:

specifies an initial payload packet including a payload, among the packets forming the session; and stores M following packets from the initial payload packet, among the packets forming the session, with the specified session information, in the storage device; and M is the smallest natural number that the size of the payload included in M packets from the initial payload packet is greater than K bytes (here, K is a natural number).

7. A network inspection system comprising:

a storage device;

a flow generation module for generating a plurality of flows formed by a plurality of packets based on the plurality of packets received from a network, wherein a flow is defined as a set of packets continuously delivered within a limited time; and a session generation module which extracts at least one session forming flow that forms the same session among the plurality of flows based on the information about the plurality of the generated flows, specifies session information based on information on the extracted at least one session forming flow, and stores payloads of K bytes (here, K is a natural number) included in the session with the specified session information in the storage device, wherein:

the session generation module stores M preceding packets of the session with the specified session information in the storage device; and M is the smallest natural number that the size of the payload included in M packets from the initial packet is greater than K bytes (here, K is a natural number).

8. A network inspection system comprising:

a storage device;

a flow generation module for generating a plurality of flows formed by a plurality of packets based on the plurality of packets received from a network, wherein a flow is defined as a set of packets continuously delivered within a limited time; and a session generation module which extracts at least one session forming flow that forms the same session among the plurality of flows based on the information about the plurality of the generated flows, specifies session information based on information on the extracted at least one session forming flow, and stores payloads of K bytes (here, K is a natural number) included in the session with the specified session information in the storage device, wherein:

the session generation module stores M following packets from an $N^{th}$ packet (here, N is a natural number) of the session, with the specified session information in the storage device; and M is the smallest natural number that the size of the payload included in M following packets from the $N^{th}$ packet of the session is greater than K bytes (here, K is a natural number).

9. A network inspection system comprising:

a storage device;

a flow generation module for generating a plurality of flows formed by a plurality of packets based on the plurality of packets received from a network, wherein a flow is defined as a set of packets continuously delivered within a limited time; and a session generation module which extracts at least one session forming flow that forms the same session among the plurality of flows based on the information about the plurality of the generated flows, specifies session information based on information on the extracted at least one session forming flow, and stores payloads of K bytes (here, K is a natural number) included in the session with the specified session information in the storage device, wherein:

the session generation module stores M following packets from an $N^{th}$ packet (here, N is a natural number) of the session, with the specified session information, in the storage device; and N is the smallest natural number that the size of the payload included in N following packets from the initial packet of the session is more than G bytes (here, G is a natural number), and M is the smallest natural number that the size of the payload included in M following packets from the $N^{th}$ packet of the session is more than K bytes (here, K is a natural number).

10. A network inspection system comprising:

a storage device;

a flow generation module for generating a plurality of flows formed by a plurality of packets based on the plurality of packets received from a network, wherein a flow is defined as a set of packets continuously delivered within a limited time; and a session generation module which extracts at least one session forming flow that forms the same session among the plurality of flows based on the information about the plurality of the generated flows, specifies session information based on information on the extracted at least one session forming flow, and stores M packets (here, M is a natural number) included in the session with the specified session information in the storage device, wherein:

the session generation module stores M following packets from an $N^{th}$ packet (here, N is a natural number), with the specified session information in the storage device; and N is the smallest natural number that the size of the payload included in N following packets from the initial packet of the session is greater than G bytes (here, G is a natural number).

\* \* \* \* \*